(12) United States Patent
Carbune et al.

(10) Patent No.: US 11,490,172 B2
(45) Date of Patent: Nov. 1, 2022

(54) METHOD AND SYSTEM FOR THE CLASSIFICATION AND CATEGORIZATION OF VIDEO PATHWAYS IN INTERACTIVE VIDEOS

(71) Applicant: Google LLC, Mountain View, CA (US)

(72) Inventors: Victor Carbune, Zurich (CH); Andrii Maksai, Zurich (CH); Sandro Feuz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/282,492

(22) PCT Filed: Jul. 23, 2019

(86) PCT No.: PCT/UA2019/000095
§ 371 (c)(1),
(2) Date: Apr. 2, 2021

(87) PCT Pub. No.: WO2021/015705
PCT Pub. Date: Jan. 28, 2021

(65) Prior Publication Data
US 2021/0385557 A1 Dec. 9, 2021

(51) Int. Cl.
*H04N 21/8541* (2011.01)
*H04N 21/8405* (2011.01)
(Continued)

(52) U.S. Cl.
CPC ..... *H04N 21/8541* (2013.01); *H04N 21/8405* (2013.01); *H04N 21/8456* (2013.01); *H04N 21/8545* (2013.01)

(58) Field of Classification Search
CPC .......... H04N 21/8541; H04N 21/8405; H04N 21/8456; H04N 21/8545
See application file for complete search history.

(56) References Cited

U.S. PATENT DOCUMENTS 9,098,807 B1 * 8/2015 Samaniego ............ G06N 5/022
9,607,656 B1 3/2017 Serce
(Continued)

OTHER PUBLICATIONS

International Search Report and Written Opinion for PCT/UA2019/000095, dated Mar. 9, 2020, 3 pages.

*Primary Examiner* — Nicholas T Corbo
(74) *Attorney, Agent, or Firm* — Dority & Manning, P.A.

(57) ABSTRACT

Methods, systems, and apparatus, including computer programs encoded on a computer storage medium, identify and classify the various video pathways in an interactive video based on the content of these video pathways. A video comprising multiple video segments is obtained from a video library. Each video segment is directly linked to at least one other video segment and the multiple video segments comprise a beginning segment, intermediate segments (including interactive segments), and final segments. Multiple video pathways in the video are identified. For each identified video pathway, classification data is generated and each such video pathway is then stored in the video library. When the video is selected from a particular category of the video library, the video segments of a video pathway that has a classification which is the same as the classification associated with the particular category, is then displayed.

15 Claims, 4 Drawing Sheets

(51) Int. Cl.
*H04N 21/845* (2011.01)
*H04N 21/8545* (2011.01)

(56) References Cited

U.S. PATENT DOCUMENTS

| | | |
|---|---|---|
| 2006/0288362 A1 | 12/2006 | Pulton, Jr. et al. |
| 2014/0052696 A1* | 2/2014 | Soroushian .......... H04N 21/482 |
| | | 707/691 |
| 2018/0013806 A1 | 1/2018 | Venkatraman et al. |
| 2018/0052758 A1* | 2/2018 | Benari ................ G06F 11/3438 |
| 2019/0098371 A1* | 3/2019 | Keesan ............ H04N 21/25883 |

* cited by examiner

METHOD AND SYSTEM FOR THE CLASSIFICATION AND CATEGORIZATION OF VIDEO PATHWAYS IN INTERACTIVE VIDEOS

PRIORITY CLAIM

The present application is a national stage filing under 35 U.S.C. § 371 of PCT Application PCT/UA2019/000095. PCT/UA2019/000095 is hereby incorporated herein by reference in its entirety. Priority is claimed to PCT/UA2019/000095.

BACKGROUND

The specification generally relates to identifying and classifying the content of an interactive video and displaying video pathways of the interactive video on a user device.

Traditional videos include a series of video segments that together make up a single video pathway. Interactive videos, on the other hand, include video segments that make up multiple different video pathways, any of which can be selected by a viewer during presentation of the video. Specifically, at different points during the presentation of an interactive video, a viewer is prompted to make certain decisions based on which the viewer ends up viewing a particular video pathway in the interactive video.

The interactive video may, for example, be used in a real-world simulator for training purposes. An operator of such a simulator, such as a simulator for simulating control of an airplane or train (or other vehicle), or e.g. a piece of complex factory machinery, may be prompted at different points in the interactive video to select one of several different options. Different selections may lead to the display of different video pathways, each of which simulates the outcome of the selection for training purposes. As another example, an interactive video can be a movie that includes multiple different video pathways. For such an interactive video, a viewer may be prompted at different points during presentation of the video to make certain decisions, which may result in displaying one of these pathways.

Because each interactive video can include multiple different video pathway, each video pathway can include a different type of content (e.g., content that is classified in a different genre).

SUMMARY

In general, one innovative aspect of the subject matter described in this specification can be embodied in methods that include the operations of obtaining, from a video library, a video comprising a plurality of video segments, wherein: each video segment is directly linked to at least one other video segment; the plurality of video segments comprise a beginning video segment, intermediate video segments, and final video segments; and the intermediate video segments comprise a set of interactive video segments, wherein each interactive video segment is directly linked to at least two other video segments, only one of which can be selected by a viewer at the end of the display of the interactive video segment; identifying a plurality of video pathways in the video, wherein each video pathway comprises a different subset of video segments from among the plurality of video segments and each subset of video segments includes the beginning video segment, a set of intermediate segments, and one final video segment; for each video pathway in the video, generating classification data that is descriptive of content in the video pathway; for each video pathway in the video, storing, based on the classification data for the video pathway, the video in a category of the video library along with other videos in the category of the video library, wherein the video library includes multiple categories that are each associated with a different classification; and displaying, upon selection of the video from a particular category of the video library and for presentation on a user device, video segments of a video pathway that has a classification which is the same as the classification associated with the particular category.

Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, the classification data that is descriptive of content in each video pathway specifies a genre classification for the video pathway.

In some implementations, the methods include identifying a set of preferred video pathways in the video, the identifying includes: obtaining a set of preferred genre classifications; and determining, from among the plurality of video pathways, a set of video pathways that each has a genre classification included in the set of preferred genre classifications.

In some implementations, the methods includes generating classification data that is descriptive of content in the video, wherein the classification data includes genre classifications that are descriptive of content in each of the plurality of video pathways; and providing, for presentation on the interface, the video and the genre classifications.

In some implementations, the displayed video segments of the video pathway include at least one interactive video segment; and the method includes providing, at the end of the display of the at least one interactive video segment, a prompt with a recommendation for the viewer to select one of the video segments (1) that are directly linked to the at least one interactive video segment and (2) that are associated with the video pathway.

In some implementations, generating classification data that is descriptive of content in each video pathway, includes: for each video segment of the video pathway, generating a distribution of scores using a genre classifier, wherein each score in the distribution of scores indicates a likelihood that the video segment is classified in a particular genre; aggregating the distribution of scores for all video segments of the video pathway; determining, based on a aggregated distribution of scores, a score that is higher than other scores in the aggregated distribution of scores; and identifying a genre associated with the determined score.

In some implementations, the methods include receiving, from a viewer, a query requesting videos in the video library that are classified as a particular genre; and in response to the query, identifying a set of videos in the video library that are classified as the particular genre, wherein the set of videos comprises a first video including plurality of video pathways and at least one video pathway in the first video having a genre classification that matches the particular genre.

Particular embodiments of the subject matter described in this specification can be implemented to realize one or more of the following advantages. The innovations described in this specification improve both the usability and the user experience with a content platform's offerings of interactive videos. Conventionally, interactive videos do not include any classification data describing the content of the various video pathways in the interactive video. Without such classification data, content platforms cannot include interactive videos along with other videos that are categorized in different categories based on the classification of the content in those videos. From a viewer's perspective, the lack of classification data for the different video pathways means that selection by a computing apparatus of appropriate interactive videos to provide as options to a user in a particular scenario may not be optimal. Additionally or alternatively, the lack of classification data may mean that the viewer may either decide not to view the interactive video (if presented as an option) or may view the interactive video but make decisions during its presentation that result in the viewer consuming a type of video pathway (e.g., of a particular genre) that is not suitable for the viewer (e.g., based on the viewer's specified interests and viewing preferences).

In contrast, the innovations described in this specification can automatically—and without any manual classification (which can consume a significant amount of time)—classify content in the different video pathways in an interactive video. Based on these classifications, the innovations described in this specification can make content in the video pathway easily accessible to viewers by presenting the interactive video along with a category of videos, which has the same or similar classification as the classification for a video pathway in the video. Moreover, when a viewer selects to view an interactive video, the innovations described in this specification simplify and improve the viewing experience of the interactive video by, for example, presenting only video segments of a video pathway in which the viewer may be interested. The innovations described in this specification can also simplify and improve the viewing experience by, for example, guiding the viewer through a series of decisions in the interactive video to ensure that the viewer only views video segments associated with the video pathway(s) that are suitable for the user (e.g., viewing video pathways that align with a viewer's interests based on the viewer's watch history and viewing preferences, or viewing video pathways that are appropriate for the task engaged by the viewer such as training for particular scenarios of vehicle).

In some implementations, the innovations described in this specification can also achieve operational efficiency (i.e., save a significant amount of time and computing resources) by identifying and classifying only those video pathways in the interactive video that are appropriate/suitable for a viewer (based on viewer's interests or the task to be engaged by a viewer, as in the case of training scenarios described above). Some interactive video can include a large number video pathways. For such interactive videos, a significant amount of time and computing resources may be required to identify and classify each of the different video pathways included in the interactive video. However, based, e.g., on the viewer's preferences and watch history, the innovations described in this specification can ignore those video pathways in which a viewer may not be interested and instead, spend time and computing resources on identifying and classifying the video pathways in which the viewer may actually be interested and/or which are of relevance to the task engaged by the viewer.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The specification generally relates to identifying and classifying various pathways in interactive video based on the content of these video pathways and displaying these video pathways to a viewer on a user device.

As described below and in more detail throughout this specification, an interactive video engine can classify the various storylines included in an interactive video. Video pathways are also referred to as storylines in this specification.

The interactive video engine first identifies all the storylines in an interactive video or a subset of these storylines. For each identified storyline, the interactive video engine uses a content classifier (such as a genre classifier, which can be implemented as a learning model, e.g., a supervised or unsupervised machine learning model) to generate the most likely or the top three (or another appropriate number) content classifications (e.g., genre classifications) for the storyline. The interactive video engine then stores the interactive video along with one or more categories of video stored in memory. Specifically, the interactive video engine stores the interactive video in each category of videos stored in memory that is associated with a classification that is the same as or similar to the one or more generated classifications for the storylines in the interactive video.

When a viewer selects the interactive video from a particular category for presentation on a user device (e.g., a browser, mobile device, televisions, etc.), the interactive video engine can display only those video segments for the storyline that have a classification which is the same as or similar to the classification associated with the particular category. Alternatively, when the viewer selects the interactive video from a particular category for presentation on a user device, the interactive video engine can play the video segments in the interactive video but include prompts with recommendations that guide the viewer to make only those decisions that result in the selection of video segments for the particular storyline.

In some implementations, a viewer can search for videos in a particular category (e.g., in a genre, such as comedy). In response to such a query, the interactive video engine presents to the viewer provides a listing of videos in this category, which includes non-interactive videos belonging to that category as well as interactive videos with video pathways belonging to that category. The listing of videos can sorted/ordered in different ways, e.g., the video's relevance to search terms in the query, the rating (by critics and/or other viewers) of the video, release date of the video, etc.

These features and additional features are described in more detail below with reference to FIGS. 1-4.

Further to the descriptions throughout this document, a user may be provided with controls allowing the user to make an election as to both if and when systems, programs, or features described herein may enable collection of information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 1:
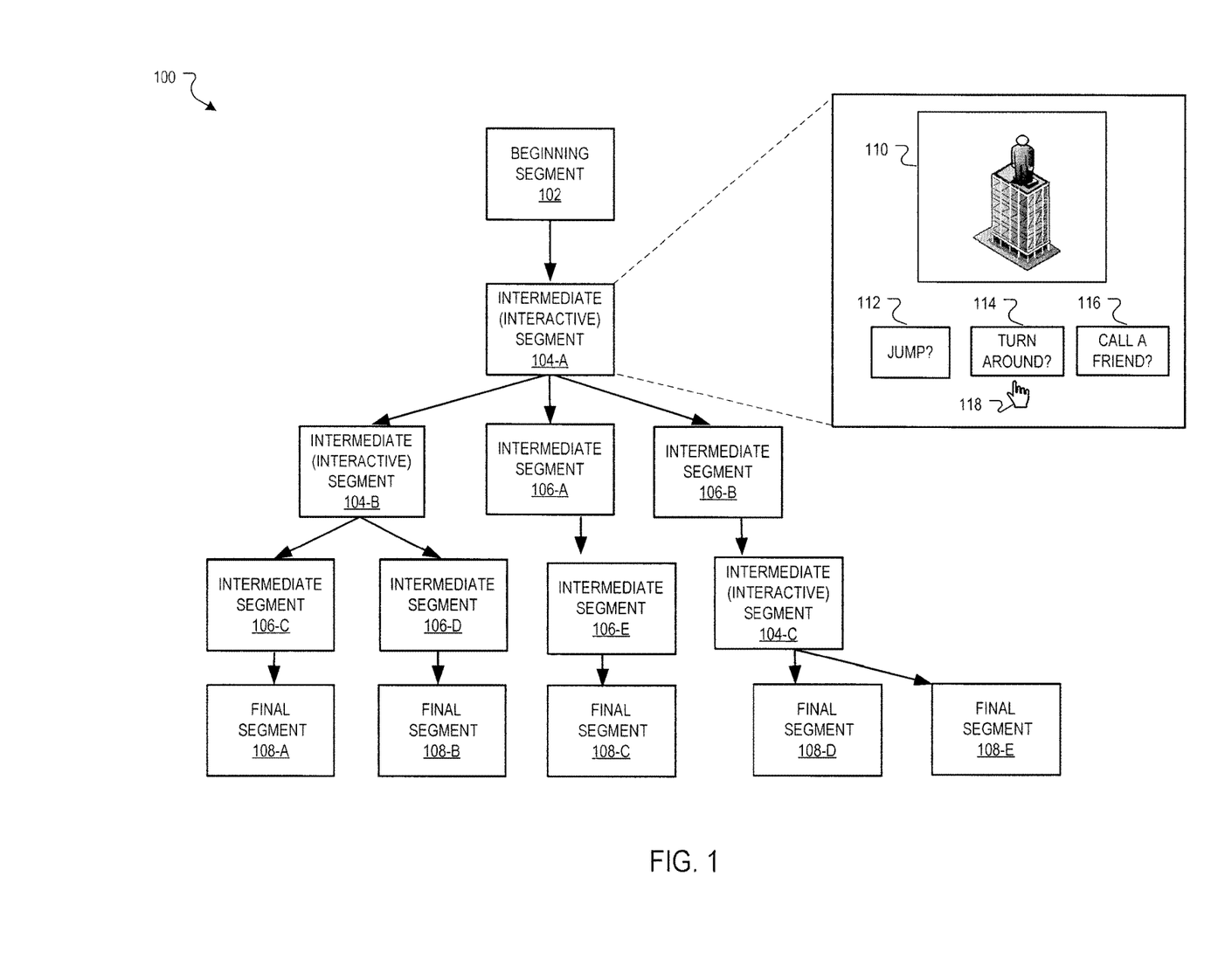
FIG. 1 is a block diagram that illustrates an example interactive video.

FIG. 1 is a block diagram that illustrates an example interactive video 100. Interactive video 100 includes multiple video segments: a beginning video segment 102, multiple intermediate video segments (104-A to C, 106-A to E), and multiple final video segments (108-A to E). The beginning video segment 102 is the first video segment of the interactive video that is presented to the user when the interactive video is launched. Each of the final video segments (108-A to E) represents the last video segment in any particular storyline in the interactive video 100. The intermediate video segments (104-A to C, 106-A to E) include all the video segments between the beginning video segment 102 and the final video segments 108-A to E.

Each video segment of the interactive video 100 is directly connected to at least one other video segment. As shown in FIG. 1, some video segments are directly connected to only one other video segment. For example, intermediate segment 106-A is directly connected only to intermediate segment 106-E, and beginning video segment 102 is directly connected only to intermediate video segment 104-A. In such instances where a video segment is directly connected to only one other video segment, the interactive video 100 seamlessly play both video segments one after the other without any pauses.

Intermediate video segments 104-A to C of the interactive video 100, which are also referred to as interactive video segments, are directly connected to more than one video segment. At the end of the display of each such interactive video segment, the interactive video 100 generally pauses and presents the viewer with a set of decisions. This is illustrated using interactive video segment 104-A that is shown in FIG. 1. At the end of the interactive video segment 104-A, a video frame 110 shows a person standing on top of the building (110) and below the video frame 110, the video presents the viewer with three decisions: (1) "Jump" 112; (2) "Turn Around" 114; and (3) "Call a Friend" 116. Each of these decisions is linked to the intermediate video segments 104-B, 106-A, and 106-B, respectively. A viewer can only select one of these decisions. When a viewer selects (e.g., using a pointing device 118 or another appropriate interface interaction technique such as a remote, a stylus, a finger touch) one of these three decisions, the interactive video 100 plays the video segment linked to the selected decision. As shown in FIG. 1, the viewer selects "Turn Around" 114, which causes the interactive video 100 to resume the interactive video by playing the intermediate video segment 106-A (which is linked to the "Turn Around" 114 decision).

Each path from the beginning video segment 102 to one of the final video segments (108-A to E) forms a storyline. FIG. 1 depicts five different storylines: (1) a first storyline made up of video segments 102, 104-A, 104-B, 106-C, and 108-A; (2) a second storyline made up of video segments 102, 104-A, 104-B, 106-D, and 108-B; (3) a third storyline made up of video segments 102, 104-A, 106-A, 106-E, and 108-C; (4) a fourth storyline made up of video segments 102, 104-A, 106-B, 104-C, and 108-D; (5) a fifth storyline made up of video segments 102, 104-A, 106-B, 104-C, and 108-E.

Each storyline is made up of a different subset of video segments selected from among the multiple video segments of the interactive video. Each such subset includes the beginning video segment 102, a set of intermediate video segments, and one final video segment.

Although FIG. 1 shows that each interactive video segment is directly connected to two or three other video segments, each interactive video segment can also be directly connected to any number (greater than one) of other video segments.

Figure 2:
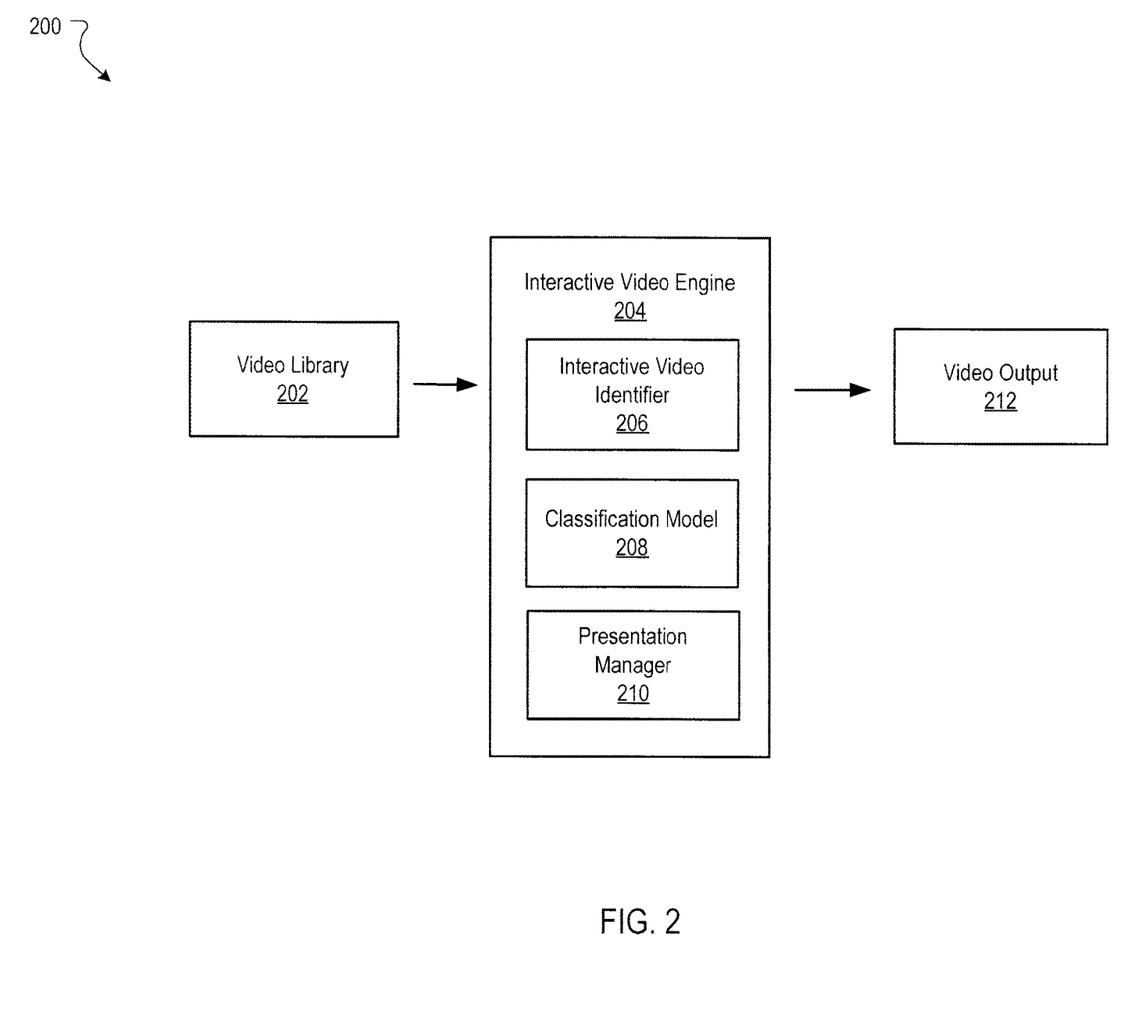
FIG. 2 is a block diagram of an example system for classifying and presenting storylines included in interactive videos.

FIG. 2 is a block diagram of an example system 200 for classifying and presenting storylines included in interactive videos.

System 200 includes an interactive video engine 204, which receives interactive videos from a video library 202. The video library 202 can be part of a content platform and can include one or more databases (or other appropriate data storage structures) stored in one or more non-transitory data storage media (e.g., hard drive(s), flash memory, etc.). The interactive video engine 204 uses its subcomponents—interactive video identifier 206, classification model 208, and presentation manager 210—to identify a set of video storylines included in the interactive video and classifies these storylines based on their content. When the viewer requests to view the interactive video, the interactive video engine 204 can play the video segments for one of the classified storyline/s that the viewer may be interested in, e.g., based on the viewer's selections, preferences (e.g., viewing preferences, vehicle/machinery control simulation), and/or watch history. The operations of the system 200 and its components are further described below with reference to FIG. 3.

Figure 3:
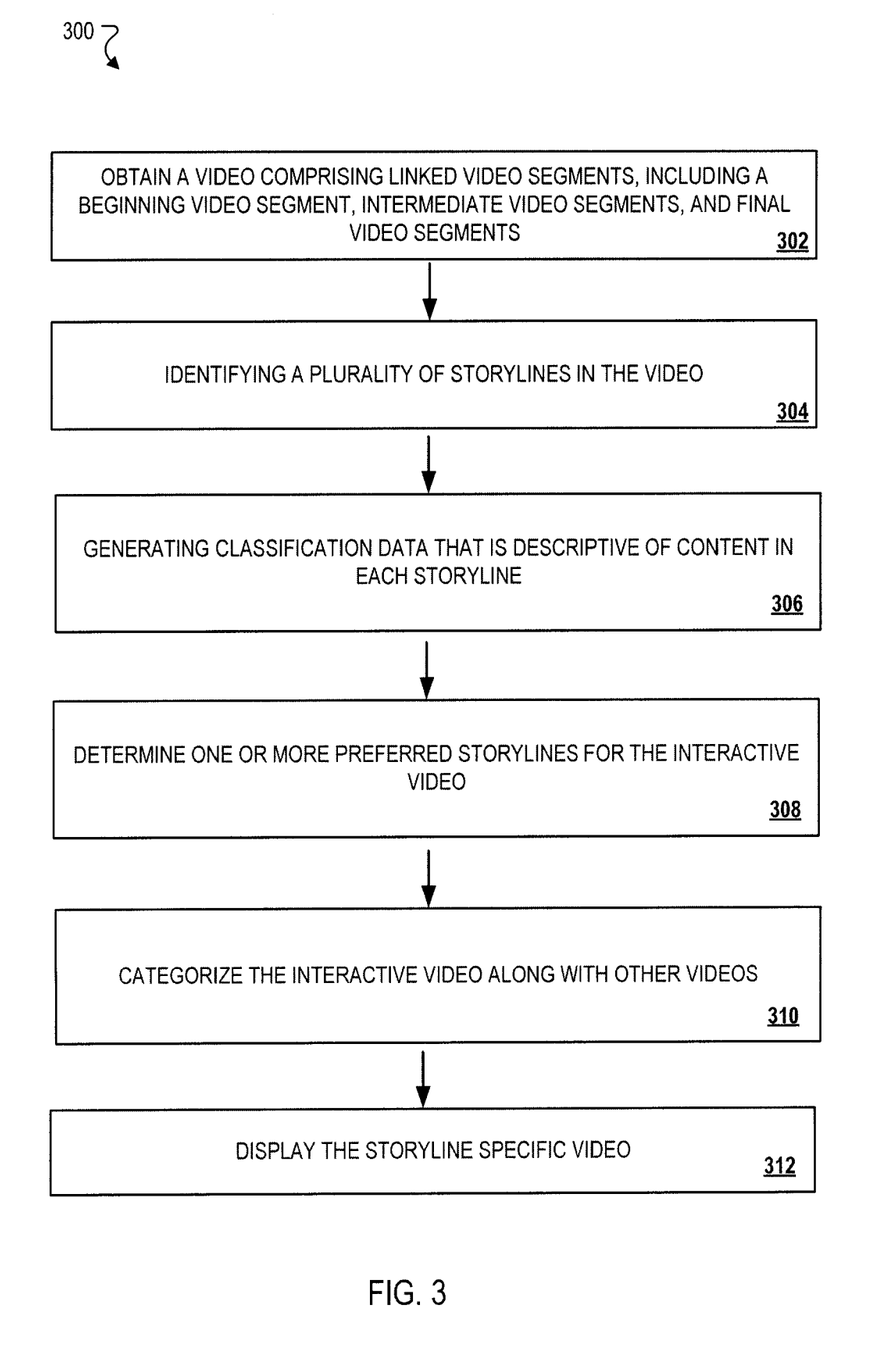
FIG. 3 is a flow diagram of an example process for classifying and presenting storylines included in interactive videos.

FIG. 3 is a flow diagram of an example process 300 for classifying and presenting story lines included in interactive videos. Operations of the process 300 are described below for illustration purposes using the system 200 and the interactive video 100. Operations of the process 300 can be performed by any appropriate device or system, e.g., any appropriate data processing apparatus. Operations of the process 300 can also be implemented as instructions stored on a non-transitory computer readable medium. Execution of the instructions cause one or more data processing apparatus to perform operations of the process 300.

The interactive video engine 204 obtains an interactive video from the video library 202 (at 302). In some implementations, the video library 202 includes a library or database of different videos that are categorized based on the classification (e.g., genre classification) of the content in the videos. Interactive videos are generally not classified in any particular genre and instead, are categorized along with other interactive videos. The video library 202 can periodically send videos that are tagged or identified (e.g., in the metadata of the interactive video) as interactive videos to the interactive video engine 204. Alternatively, the interactive video engine 204 can query the video library 202 for videos that are tagged or identified as interactive videos and in response, receive the interactive videos from the video library 202.

The interactive video identifier 206 identifies different storylines in the interactive video (at 304). The interactive video identifier 206 identifies the different storylines in the interactive video by first identifying the different interactive video segments within the interactive video. In some implementations, the interactive video identifier 206 can search for and identify video segments that are identified using an "interactive segment" or other similar tag. In some implementations, the interactive video's metadata (or other portion of the video, such as its presentation layer) can expose various decisions points in the interactive video where a user is requested to interact with the video. In such implementations, the interactive video identifier 206 can use these decision points to identify the interactive video segments associated with these decisions.

The interactive video identifier 206 can then use the decision points in the identified interactive video segments to identify each possible path of video segments from the beginning video segment 102 to one of the final video segments 108-A to E in the interactive video. Each of these possible paths represents a different storyline in the interactive video.

In some instances, an interactive video can have a large number of storylines. In such instances, identifying each possible storyline can consume a significant amount of time and computing resources. To reduce the amount of time and resources required to identify storylines, the interactive video identifier 206 can be configured to generate only a subset of storylines in which a particular viewer may be interested (and conversely, ignore those storylines in which the user may not be interested and/or which may not be relevant), as further described below.

In some implementations, the interactive video identifier 206 identifies a subset of storylines (from among the different possible storylines included in the video) by using a learning model. When such a model receives as input a set of decisions in an interactive video segment, it determines the decisions that a viewer is likely to make based on the viewer's viewing preferences and/or the viewing preferences of other users that are similar to the viewer's viewing preferences. Such a model can be implemented as a supervised or unsupervised machine learning model. In some implementations, this model can be a supervised machine learning model that is trained using multiple sets of decisions and the viewer's (and/or other viewers' with similar viewing preferences) selected decisions. Thus, by using such a model, the interactive video identifier 206 can identify the decisions that a viewer is likely to make when presented with an interactive video segment. Using the information about the decisions that a viewer is likely to make, the interactive video identifier 206 then identifies only those paths (or storylines) associated with the likely to be selected decisions.

The classification model 208 generates classification data that is descriptive of the content in each storyline identified in operation 304 (at 306). In some implementations, the classification model 208 can include a classifier as well as a combiner model (which are further described below) that operate together to generate a content classification that is descriptive of the content in each storyline. In some implementations, the content classification can be a genre classification (e.g., comedy, horror, drama, a first vehicle control scenario, a second (different) vehicle control scenario, a third (different) vehicle control scenario, a fourth (different) vehicle control scenario, etc.). However, the content classification is not limited to genre classifications and in some implementations, the content could be classified based on other categorizations, such as, e.g., location (e.g., sea, mountain, forest, etc.), sentiments (happy, sad, etc.). The descriptions below describe one such classifier (a genre classifier); however, it will be appreciated the same descriptions and can be used by any other type of classifier that classifies content into categories other than genre (as described above).

In some implementations, the classifier can be a genre classifier (which can implemented as a genre classification neural network) that is trained using a set of training videos as well as their known genre classifications, determines a genre classification for each video segment in the interactive storyline. Thus, for each input video segment of the storyline, the genre classifier outputs a score distribution across different possible genres, e.g., a score (ranging from 0 to 1, which specifies a likelihood that a particular video segment can be classified into a particular genre) for each possible genre. For example, the genre classifier may determine that a particular video segment has the following score distribution: [Comedy: 0; Drama: 0.4; Horror: 0.93; Action: 0.5]. Alternatively, the genre classifier may determine, for example, that a particular video segment has the following score distribution [First vehicle control scenario: 0; Second vehicle control scenario: 0.4; Third vehicle control scenario: 0.93; Fourth vehicle control scenario: 0.5].

Depending on the length of each video segment (which may vary across different segments), the content of a video segment may not be long enough to provide sufficient context for the genre classifier to provide a meaningful genre classification scoring distribution. Thus, as an alternative to scoring each video segment, the genre classifier can score a sequence of video segments that provide more context to the content within the sequence of video segments. The genre classifier can identify a sequence of video segments in a storyline in different ways. As one example, the genre classifier can identify video segments between different interactive video segments, the video segments between the beginning segment 102 and the first interactive video segment, and the video segments between the last interactive video segment of the storyline and the final video segment of the storyline. The genre classifier then scores each sequence of video segments in the storyline, in the same manner as described in the preceding paragraphs with reference to a single video segment.

Using the score distributions for each video segment in the storyline (or for each sequence of video segments in the storyline), a combiner model determines the most likely genre (or the top two or three likely genres) for the storyline. In some implementations, the combiner model aggregates (e.g., sums up) the scoring distributions for each video segment (or each sequence of video segments) to determine a total score for each genre in the storyline. From these determined total scores for each genre, the combiner model identifies the genre with the highest score as the genre classification for the storyline. Alternatively, the combiner model identifies, as genre classifications for the storyline, the top three genres (or any appropriate other number of genres) with the highest total scores in the total score distribution.

Alternatively, instead of scoring each video segment in the storyline or multiple sequences of video segments in the storyline, the entire sequence of video segments that make up a storyline may be input to the genre classifier, which then outputs the score distribution for all the different genres in the storyline. From this score distribution, the combiner model identifies the genre with the highest score or the top three (or another appropriate number) highest scoring genres as the genre classification/s for the storyline (in the same manner as described above).

The classification model 208 determines one or more preferred storylines for the interactive video (at 308). The classification model 208 can use a viewer's watch history and/or viewing preferences to determine a viewer's preferred storylines. Using the user's preferred genres, the classification model 208 can determine one or more storylines that have the same genres as those identified in the storylines identified in operation 306. For example, if a user's viewing preferences indicate that the viewer primarily watches content classified as relating to a particular vehicle control (training) scenario, or e.g. as comedy, the classification model identifies only those story lines from among all the storylines identified at operation 306 that were classified as relating to that particular vehicle control (training) scenario, or as comedy.

The presentation manager 210 categorizes the interactive video along with other videos in the video library 202 that have the same or similar classification as the classifications determined for the storylines that are identified in operation 308 (at 310). For example, if the classification model determines that the identified storylines in the interactive video are classified as, e.g., comedy and drama, or as relating to a particular vehicle control (training) scenario, the presentation manager 210 can then include the interactive video along with other videos included or categorized as part of the same genre in the video store. For example, the presentation manager 210 can then include the interactive video along with other videos included or categorized as part both the comedy and drama genres in the video library 202.

In some implementations, the classification model 208 may not identify preferred storylines in the interactive videos (as described with reference to operation 308). In such implementations, the presentation manager 210 categorizes the interactive video along with other videos categorized in genres that are the same as those identified in each of the storylines in the interactive video (that were identified in operation 306). Each category of videos in the video library 202 is associated with a particular classification.

The presentation manager 210 displays, during presentation of the interactive video, the video segments associated with a storyline (at 312). When a viewer selects to view the interactive video, the presentation manager 210 first retrieves the selected interactive video from the video library 202. The presentation manager 210 then identifies the genre classification associated with the particular category of the video library from which the viewer selected video. Using this identified genre classification, the presentation manager 210 determines the video segments in the interactive video for the storyline with that particular genre classification (i.e., the storyline that has a genre classification that is the same as the genre classification associated with the particular category of the video library 202).

The presentation manager 210 then displays the identified video segments on a user device (e.g., browser, mobile device, televisions, etc.). This can be accomplished in any of the following ways. In some implementations, the presentation manager 210 can seamlessly display (e.g., without pausing the video to display any of the interactive decisions) the video segments for the storyline. For example, the presentation manager 210 can automatically select all decisions—i.e., without any viewer interaction—which then results in the video segments for the storyline being played in sequence without any pauses (or without requiring any viewer interaction).

In some implementations, the presentation manager 210 can allow the viewer to interact with the video to make decisions, although in such implementations, the presentation manager 210 provides prompts with recommendations about which decisions to select such that the user continues to view the video segments associated with the preferred storyline. For example, using interactive video segment 104-A for illustration, the presentation manager 210 can highlight the decision (e.g., mark it with a particular color, flash the button associated with that decision, etc.) that the user must select to continue in the preferred comedy genre. Alternatively, or in addition, the presentation manager 210 can insert recommendation text on the interface that prompts the viewer to make a particular decision, such as for example, "select this decision if you want to continue in this particular training scenario" or "select this decision if you want to continue watching comedy." The presentation manager 210 can also include text on other decisions of the interactive video segment that indicate the type of genre that the user might encounter if those other decisions are selected, such as for example, "select this decision only if you want to watch a horror story" or "select this decision only if you want to take part in another training scenario."

In some implementations, the classification model 208 may not categorize (as described with reference to operation 310) the interactive video into any of the genre-specific categories of videos stored in the video library 202. In such implementations, the presentation manager 210 can maintain the interactive video within an interactive video category (which includes other interactive videos) and can include text that describes the genre classification/s for the preferred storyline/s in the interactive video. For example, if the classification model classifies the preferred storylines in the interactive video (e.g., as "comedy," "horror," and "drama," or as "training scenario 1", "training scenario 2", "training scenario 3" and "training scenario 4"), the presentation manager 210 can use these classifications to tag or identify the interactive video with these classificatinos. Viewers can use this classification information for the interactive video to decide whether to view the interactive video. This classification can be presented to the viewer, even if the video is categorized along with other videos included in different genres.

Moreover, in such implementations where the interactive video is categorized along with other interactive videos, when the viewer selects to view the interactive video, the presentation manager 110 displays the interactive video along with textual prompts with recommendations (as described above) along with the decisions. These prompts describe the type of storyline that might result if the viewer selected any particular decision.

In some implementations, a viewer can also search for and retrieve videos (including interactive videos) that are stored in the video library 202. In such implementations, the front end interface of the video library 202 (or another service, e.g., a search engine, that allows searching for videos stored in the video library 202) can receive a search query from the viewer, which can, e.g., specify a content classification (e.g., a genre classification, such as comedy) and/or additional search terms that specify additional aspects that the viewer desires to see (e.g., animals, popular actors, etc.). The search query is transmitted to the presentation manager 210 (or alternatively, may be handled and processed by another service, e.g., a search engine), which identifies (from the video library 202) a list of videos in response to the viewer's query.

In some implementations, the presentation manager 210 (or alternatively, another service such as a search engine) uses the content classifications of videos, such as genre classifications (that are included with non-interactive videos and/or that are generated for interactive videos, as described with reference to FIGS. 2 and 3), and the other data stored about the videos in the video library 202 (e.g., names of actors, brief description about the video, release date, etc.) to identify videos responsive to the search query. For example, if the viewer's query requested "comedy including actor John Smith," the presentation manager 210 (or another service such as a search engine) identifies videos in the video library that have been classified as "Comedy" and that include an actor named "John Smith."

The presentation manager 210 (or another service such as a search engine) identifies both the non-interactive videos that meet the query parameters as well as interactive videos that meet these parameters. When identifying an interactive video that is responsive to a search query, the presentation manager 210 (or another service such as a search engine) determines whether the query parameter specifying a content classification (e.g., a genre classification such as comedy) matches the classification generated (as described above with reference to FIGS. 2 and 3) for any of the storylines included in the interactive video. If so, the presentation manager 210 (or another service such as a search engine) identifies the interactive video as responsive to the query.

Prior to presenting the list of identified videos to the viewer, the presentation manager 210 (or another service, such as a search engine) can sort the identified videos in different ways. In some implementations, the list of videos can be sorted alphabetically. Alternatively or additionally, the list of videos can be sorted based on the release date of the video. For example, the list of videos can be sorted, using the release dates, from most recent to least recent. Alternatively or additionally, the list of videos can be sorted based on relevance to the query. For example, if the query requests "comedy videos of John Smith," the list of videos may rank a comedy movie including John Smith as higher than a comedy video including John Smithstone. Alternatively or additionally, the list of videos can be sorted based on rating (e.g., critics' rating and/or ratings by other viewers) assigned to the different videos on the list. For example, the list of videos can be sorted, using the critics' ratings, from highest rating to lowest rating. It will be appreciated that the videos can be sorted in any number of other ways (such as gross viewership generated by the videos, etc.).

Figure 4:
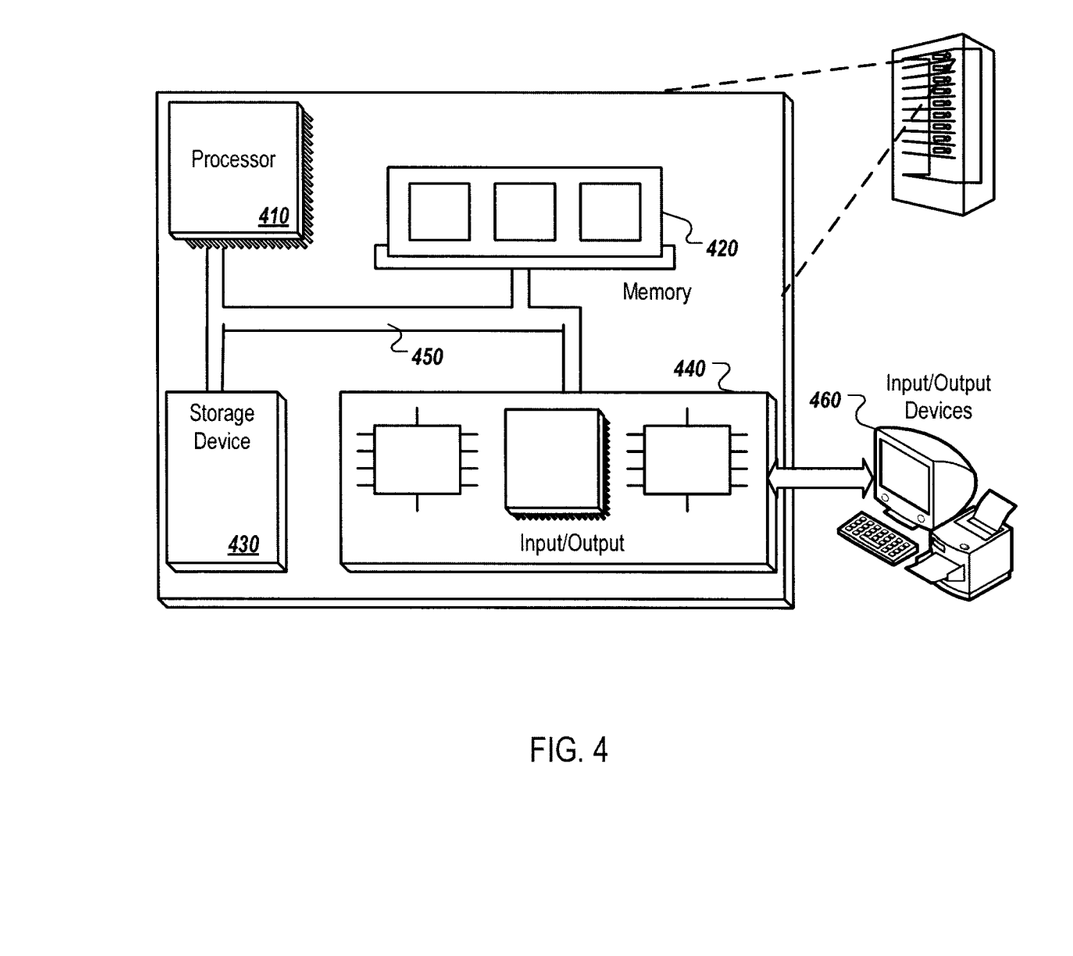
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. As used in this specification, an engine can be any data processing apparatus that is configured to perform a set of tasks using the hardware and/or software of the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer implemented method, comprising:
obtaining, from a video library, a video comprising a plurality of video segments, wherein:
each video segment is directly linked to at least one other video segment;
the plurality of video segments comprise a beginning video segment, intermediate video segments, and final video segments; and
the intermediate video segments comprise a set of interactive video segments, wherein each interactive video segment is directly linked to at least two other video segments, only one of which can be selected by a viewer at the end of the display of the interactive video segment;
identifying a plurality of video pathways in the video, wherein each video pathway comprises a different subset of video segments from among the plurality of video segments and each subset of video segments includes the beginning video segment, a set of intermediate segments, and one final video segment;
for each video pathway in the plurality of video pathways, generating classification data that is descriptive of content in the video pathway, wherein the classification data that is descriptive of content in each video pathway specifies a genre classification for the video pathway;
wherein generating classification data that is descriptive of content in each video pathway, includes:
for each video segment of the video pathway, generating a distribution of scores using a genre classifier, wherein each score in the distribution of scores indicates a likelihood that the video segment is classified in a particular genre;
aggregating the distribution of scores for all video segments of the video pathway;
determining, based on an aggregated distribution of scores, a score that is higher than other scores in the aggregated distribution of scores; and
identifying a genre associated with the determined score;
for each video pathway in the plurality of video pathways, storing, based on the classification data for the video pathway, the video in a category of the video library along with other videos in the category of the video library, wherein the video library includes multiple categories that are each associated with a different classification; and displaying, upon selection of the video from a particular category of the video library and for presentation on a user device, video segments of a video pathway that has a classification which is the same as the classification associated with the particular category.

2. The computer implemented method of claim 1, further comprising identifying a set of preferred video pathways in the video, wherein the identifying includes: obtaining a set of preferred genre classifications; and determining, from among the plurality of video pathways, a set of video pathways that each has a genre classification included in the set of preferred genre classifications.

3. The computer implemented method of claim 1, further comprising:
generating classification data that is descriptive of content in the video, wherein the classification data includes genre classifications that are descriptive of content in each of the plurality of video pathways; and
providing, for presentation on the user device, the video and the genre classifications.

4. The computer implemented method of claim 1:
wherein the displayed video segments of the video pathway include at least one interactive video segment; and
the computer implemented method of claim 1 further comprising:
providing, at the end of the display of the at least one interactive video segment, a prompt with a recommendation for the viewer to select one of the video segments (1) that are directly linked to the at least one interactive video segment and (2) that are associated with the video pathway.

5. The computer implemented method of claim 1, further comprising:
receiving, from a viewer, a query requesting videos in the video library that are classified as a particular genre; and
in response to the query, identifying a set of videos in the video library that are classified as the particular genre, wherein the set of videos comprises a first video including a plurality of video pathways and at least one video pathway in the first video having a genre classification that matches the particular genre.

6. A system, comprising:
one or more memory devices storing instructions; and
one or more data processing apparatus that are configured to interact with the one or more memory devices, and upon execution of the instructions, perform operations including:
obtaining, from a video library, a video comprising a plurality of video segments, wherein:
each video segment is directly linked to at least one other video segment;
the plurality of video segments comprise a beginning video segment, intermediate video segments, and final video segments; and
the intermediate video segments comprise a set of interactive video segments, wherein each interactive video segment is directly linked to at least two other video segments, only one of which can be selected by a viewer at the end of the display of the interactive video segment;
identifying a plurality of video pathways in the video, wherein each video pathway comprises a different subset of video segments from among the plurality of video segments and each subset of video segments includes the beginning video segment, a set of intermediate segments, and one final video segment;

for each video pathway in the plurality of video pathways, generating classification data that is descriptive of content in the video pathway, wherein the classification data that is descriptive of content in each video pathway specifies a genre classification for the video pathway;

wherein generating classification data that is descriptive of content in each video pathway, includes:

for each video segment of the video pathway, generating a distribution of scores using a genre classifier, wherein each score in the distribution of scores indicates a likelihood that the video segment is classified in a particular genre;

aggregating the distribution of scores for all video segments of the video pathway;

determining, based on an aggregated distribution of scores, a score that is higher than other scores in the aggregated distribution of scores; and identifying a genre associated with the determined score;

for each video pathway in the plurality of video pathways, storing, based on the classification data for the video pathway, the video in a category of the video library along with other videos in the category of the video library, wherein the video library includes multiple categories that are each associated with a different classification; and displaying, upon selection of the video from a particular category of the video library and for presentation on a user device, video segments of a video pathway that has a classification which is the same as the classification associated with the particular category.

7. The system of claim 6, wherein the one or more data processing apparatus are configured to perform operations further comprising:

identifying a set of preferred video pathways in the video, the identifying includes:

obtaining a set of preferred genre classifications; and determining, from among the plurality of video pathways, a set of video pathways that each has a genre classification included in the set of preferred genre classifications.

8. The system of claim 6, wherein the one or more data processing apparatus are configured to perform operations further comprising:

generating classification data that is descriptive of content in the video, wherein the classification data includes genre classifications that are descriptive of content in each of the plurality of video pathways; and providing, for presentation on the user interface, the video and the genre classifications.

9. The system of claim 6:

wherein the displayed video segments of the video pathway include at least one interactive video segment; and wherein the one or more data processing apparatus are configured to perform operations further comprising:

providing, at the end of the display of the at least one interactive video segment, a prompt with a recommendation for the viewer to select one of the video segments (1) that are directly linked to the at least one interactive video segment and (2) that are associated with the video pathway.

10. The system of claim 6, wherein the one or more data processing apparatus are configured to perform operations further comprising:

receiving, from a viewer, a query requesting videos in the video library that are classified as a particular genre; and in response to the query, identifying a set of videos in the video library that are classified as the particular genre, wherein the set of videos comprises a first video including a plurality of video pathways and at least one video pathway in the first video having a genre classification that matches the particular genre.

11. A non-transitory computer readable medium storing instructions that, when executed by one or more data processing apparatus, cause the one or more data processing apparatus to perform operations comprising:

obtaining, from a video library, a video comprising a plurality of video segments, wherein:

each video segment is directly linked to at least one other video segment;

the plurality of video segments comprise a beginning video segment, intermediate video segments, and final video segments; and the intermediate video segments comprise a set of interactive video segments, wherein each interactive video segment is directly linked to at least two other video segments, only one of which can be selected by a viewer at the end of the display of the interactive video segment;

identifying a plurality of video pathways in the video, wherein each video pathway comprises a different subset of video segments from among the plurality of video segments and each subset of video segments includes the beginning video segment, a set of intermediate segments, and one final video segment;

for each video pathway in the plurality of video pathways, generating classification data that is descriptive of content in the video pathway, wherein the classification data that is descriptive of content in each video pathway specifies a genre classification for the video pathway;

for each video segment of the video pathway, generating a distribution of scores using a genre classifier, wherein each score in the distribution of scores indicates a likelihood that the video segment is classified in a particular genre;

aggregating the distribution of scores for all video segments of the video pathway;

determining, based on an aggregated distribution of scores, a score that is higher than other scores in the aggregated distribution of scores;

identifying a genre associated with the determined score;

for each video pathway in the plurality of video pathways, storing, based on the classification data for the video pathway, the video in a category of the video library along with other videos in the category of the video library, wherein the video library includes multiple categories that are each associated with a different classification; and displaying, upon selection of the video from a particular category of the video library and for presentation on a user device, video segments of a video pathway that has a classification which is the same as the classification associated with the particular category.

12. The non-transitory computer readable medium of claim 11, further comprising:
   identifying a set of preferred video pathways in the video, the identifying includes:
      obtaining a set of preferred genre classifications; and
      determining, from among the plurality of video pathways, a set of video pathways that each has a genre classification included in the set of preferred genre classifications.

13. The non-transitory computer readable medium of claim 11, further comprising:
   generating classification data that is descriptive of content in the video, wherein the classification data includes genre classifications that are descriptive of content in each of the plurality of video pathways; and
   providing, for presentation on the user device, the video and the genre classifications.

14. The non-transitory computer readable medium of claim 11:
   wherein the displayed video segments of the video pathway include at least one interactive video segment; and
   the non-transitory computer readable medium of claim 11 further comprising:
      providing, at the end of the display of the at least one interactive video segment, a prompt with a recommendation for the viewer to select one of the video segments (1) that are directly linked to the at least one interactive video segment and (2) that are associated with the video pathway.

15. The non-transitory computer readable medium of claim 11, further comprising:
   receiving, from a viewer, a query requesting videos in the video library that are classified as a particular genre;
   in response to the query, identifying a set of videos in the video library that are classified as the particular genre, wherein the set of videos comprises a first video including a plurality of video pathways and at least one video pathway in the first video having a genre classification that matches the particular genre.

* * * * *